United States Patent [19]
Shang et al.

[11] Patent Number: 5,171,406
[45] Date of Patent: Dec. 15, 1992

[54] FLUIDIZED BED SELECTIVE PYROLYSIS OF COAL

[75] Inventors: Jer Y. Shang, McLean, Va.; Chang Y. Cha, Golden, Colo.; Norman W. Merriam, Laramie, Wyo.

[73] Assignee: Western Research Institute, Laramie, Wyo.

[21] Appl. No.: 599,322

[22] Filed: Oct. 17, 1990

Related U.S. Application Data

[63] Continuation-in-part of Ser. No. 343,728, Apr. 26, 1989, abandoned.

[51] Int. Cl.⁵ ............................................. C10B 49/10
[52] U.S. Cl. ........................................ 201/31; 201/29; 201/38; 201/44
[58] Field of Search ................. 201/29, 31, 36, 41, 201/44, 38; 44/626; 48/210; 34/10, 36

[56] References Cited

U.S. PATENT DOCUMENTS

| | | | |
|---|---|---|---|
| 1,594,994 | 8/1926 | Bone | 44/626 |
| 2,639,263 | 5/1953 | Lefer | 201/38 |
| 2,773,018 | 12/1956 | Parry | 201/31 |
| 3,076,751 | 2/1963 | Minet | 201/31 |
| 3,394,463 | 7/1968 | Futer | 34/10 |
| 3,562,115 | 2/1971 | Dunlop | 201/31 |
| 3,574,065 | 4/1971 | Eddinger et al. | 201/31 |
| 3,663,421 | 5/1972 | Parr | 201/36 |
| 3,951,856 | 4/1976 | Repik et al. | 201/38 |
| 4,069,024 | 1/1978 | Fernandes | 201/31 |
| 4,326,857 | 4/1982 | Kato et al. | 201/31 |
| 4,344,821 | 8/1982 | Angelo | 201/38 |
| 4,501,551 | 2/1985 | Riess et al. | 34/10 |
| 4,512,777 | 4/1985 | Wild | 48/210 |
| 4,725,337 | 2/1988 | Greene | 201/29 |

*Primary Examiner*—Joye L. Woodard
*Attorney, Agent, or Firm*—John O. Mingle

[57] ABSTRACT

The present invention discloses a process for the pyrolysis of coal which comprises the effective utilization of two zonal inclined fluidized beds, where said zones can be selectively controlled as to temperature and heating rate. The first zonal inclined fluidized bed serves as a dryer for crushed coal and additionally is controlled to selectively pyrolyze said coal producing substantially carbon dioxide for recycle use. The second zonal inclined fluidized bed further pyrolyzes the coal to gaseous, liquid and char products under controlled temperature and heating rate zones designed to economically integrate the product mix. The gas and liquid products are recovered from the gaseous effluent stream while the char which remains can be further treated or utilized in a subsequent process step.

9 Claims, 9 Drawing Sheets

FLUIDIZED BED SELECTIVE PYROLYSIS OF COAL

This invention was made with Government support under DE-AC21-87MC24268 awarded by the Department of Energy. The Government has certain rights in this invention.

This invention represents a continuation-in-part of Ser. No. 07/343,728, filed Apr. 26, 1989, entitled Mild Coal Gasification System, the disclosure of which is herein incorporated by reference, and said prior application is expressly abandoned.

BACKGROUND OF INVENTION

1. Field of Invention

The present invention relates to a process using an inclined fluidized bed for performing mild coal gasification, and producing valuable products.

2. Background

Coal has served as a base material for the production of valuables products for many centuries. Dyes have been obtained from benzene, naphthalene, and anthracene; all common coal products. The pharmaceutical and pesticide industries have commonly employed coal tar components. Creosote from coal is a common wood preservative. Coal phenols have been employed as antiseptics. Coking has produced the by-products of ammonia and synthesis gases, while resins and early plastics came from coal oil.

In the early part of this century, processes for smoke abatement lead to the invention of coke and liquid products by low-temperature distillation. This work by Thomas Parker lead to the Coalite and Rexco Processes in England and the Disco Process in the United States.

Retort methods for coal gas production, such as the Parker, Phurnacite, and Krupp-Lurgi processes, appeared in the decades of 1920 and 1930. These were atmospheric pressure retorts heating coal indirectly through metal walls to temperatures about 650° C. The beds were kept thin so as to heat uniformly and produce good-quality char for "smokeless fuel". These batch retorts were operated in large staggered blocks to produce a steady flow of char, tar and gas. The Coalite Chemical Products Works at Bolsover, England, processed over 300,000 tons of coal annually by using 448 retorts, and some of these retorts are still in use producing chemicals from coal tars. However, most batch systems were replaced by continuous ones after World War II.

Higher throughput resulted in the use of moving bed processes for low-temperature devolatilization from the 1930's on, but operating conditions were more critical and feed coal selection was important. Two common methods were to have vertical moving beds, or nearly horizonal rotary drums.

The Disco Process of Pittsburgh Consolidated Coal Company used such a horizonal rotary drum, indirectly heated, to produce balls of agglomerated coal which had been partially vaporized. However, precise control by carefully blending recycle char with coal feed and imposing temperature requirements was needed to keep excessive reactor wall caking from occurring. In 1949 such a plant was built that processes 1000 tons of coal daily.

In Germany and Japan the Lurgi-Spulgas process was used before and during World War II to make transportation fuel, feedstocks and chemicals. Here a downward flow of mildly caking coal at atmospheric pressure was directly heated by upward flowing flue gas to about 650° C. Similar processes used the names Koppers Vertical Ovens, Mimura, Shimomura, Wanishi, and Knowles in Japan and Krupp-Lurgi, Geissen, Bursig-Geissen, and Rolle in Germany.

With the advent of an international distribution system for petroleum after World War II, low-temperature devolatilization of coal rapidly declined, and many such plants were shutdown. When the oil shortages of the 1970's appeared, increased interest in such processes reappeared, but now with the utilization of modern fluidized bed technology, which featured high sweep gas rates, small particle sizes and allowed rapid heating of high-volatile coals resulting in improved yields of coal tars. However, in Germany, Yugoslavia and England plants using the Lurgi-Ruhrgas processes were built from the late 1960's on. Here a screw-mixer is combined with a fluidized bed using recycle char mixed with the feed coal.

In the United States the development of synfuel processes occurred during the decade of the 1970's. The COED process used a series of fluidized beds to stepwise carbonize caking coals at higher and higher temperatures. The Clean Coke method utilized a fluidized bed devolatilizer, while an entrained bed reactor for flash devolatilization was employed by Occidental.

Currently the only known commercial low-temperature plants are in England, South Africa and India.

In the United States most recent development concentrated on high temperature, high pressure processes designed to produce maximum yields of liquid and gaseous products; however, economic concerns have not been favorable for commercial exploitation. Currently mild gasification plants are not competitive with petroleum in the United States, but England does have two operating facilities producing "smokeless fuel". Such processes produce char that is too weak and friable to support deep beds needed for blast furnaces; thus, using low-temperature char for coke production is not feasible. Yet, from an economic viewpoint, any char produced must be marketable.

By 1963 the Lurgi-Ruhrgas process had been modified to use lignite fines in Yugoslavia, and for producing char fines from high-volatile bituminous coal by briquetting in Germany in 1975 and England in 1977. However, coal tars from this process produced by flash devolatilization have been of poor quality consisting of heavy, highly aromatic components with high melting points. Further, the high dust content has been an additional problem.

Prior art United States patents covering the above mentioned concepts include:

| U.S. Pat. No. | Inventor | Year |
|---|---|---|
| 2,639,263 | Leffer | 1953 |
| 2,773,018 | Parry | 1956 |
| 3,076,751 | Minet | 1963 |
| 3,394,463 | Futer | 1968 |
| 3,562,115 | Dunlop | 1971 |
| 3,574,065 | Eddinger | 1971 |
| 3,663,421 | Parr | 1972 |
| 3,951,856 | Repik | 1976 |
| 4,069,024 | Fernandes | 1978 |
| 4,326,857 | Kato | 1982 |
| 4,344,821 | Angelo | 1982 |
| 4,501,551 | Riess | 1985 |
| 4,512,777 | Wild | 1985 |

Referring to the above list, Leffer discloses an early conventional fluidized bed to "distill" solid hydrocarbonaceous material. Parry discloses an externally heated conventional fluidized bed lignite system for its drying, preheating and devolatilization. Minet discloses a conventional fluidized bed system using steam and a temperature below 840° F., or 449° C., with recycle solids to avoid agglomeration. Futer discloses a nonfluidizing system of horizonal stair-step moving beds designed to effectively heat the material. Dunlop discloses a carbonization retort heated by a surrounding conventional fluidized bed. Eddinger discloses a series of increasing temperature conventional coal fluidized beds, using recycled gas and recycled char, obtaining a separation of liquid products that is recovered from each fluidizing stage. Parr discloses a series of concatenated slanting trays each holding fluidized particles to produce an upper retort section and a lower combustion section containing a plurality of sidestreams. Repik discloses a high oxygen content conventional coal fluidized bed to produce first non-agglomerative char, then activated carbon. Fernandes discloses a fixed high-sulfur coal bed to produce "clean" low-Btu gas using steam. Kato uses a simple inclined fluidized bed using hydrogen to react with coal under high pressure to produce high-Btu gas. Angelo discloses a rotating drum retort using steam to make activated carbon from coal. Riess discloses a conventional fluidized bed method of coal drying to obtain a better coal product. Wild discloses a method of treating synthesis gas under high pressure to separate aqueous and hydrocarbon streams.

The present invention, like many of the above, is designed to process coal. However, as will be shown subsequently, it uses inclined fluidized beds, not conventional fluidized ones at normal pressures, but recycled inert gases to produce selected products by proper use of selective temperature and heating rate controls.

SUMMARY OF INVENTION

The objectives of the present invention include overcoming the above-mentioned deficiencies in the prior art and providing a process of coal devolatilization that is not only economical but yields a predictable spectrum of desirable products.

According to the present invention, the process consists of the effective utilization of two zonal inclined fluidized beds, where said zones can be selectively controlled as to temperature and heating rate if so required. The first zonal inclined fluidized bed serves as a dryer for crushed coal and selectively pyrolyzes the coal to product carbon dioxide for recycle use. The second zonal inclined fluidized bed further pyrolyzes the coal to gaseous, liquid and char products under controlled temperature and heating rate zones designed to economically integrate the product mix. The gas and liquid products are recovered from the gaseous effluent stream while the char which remains can be further treated or utilized in a subsequent process step.

The zonal inclined fluidized beds offer a process flexibility by allowing both temperature and heating rate zonal control which allows substantial desirable pyrolyses to be occurring; thus, the various products can be adjusted to marketplace economics. Further, inclined fluidized beds operate under plug-flow conditions minimizing backmixing and keeping the thermal efficiency high. Finally, overall environmental acceptability for the process is obtainable because of its control flexibility.

DETAILED DESCRIPTION OF INVENTION

The current invention is described first as employed in the bench-scale version gaged to approximately a 10 lb/hr feed rate of coal, and secondly as tested in a 100 lb/hr unit designed to utilize recycle gas and investigate larger scale problems. In addition several types of coal are considered.

Figure 1:
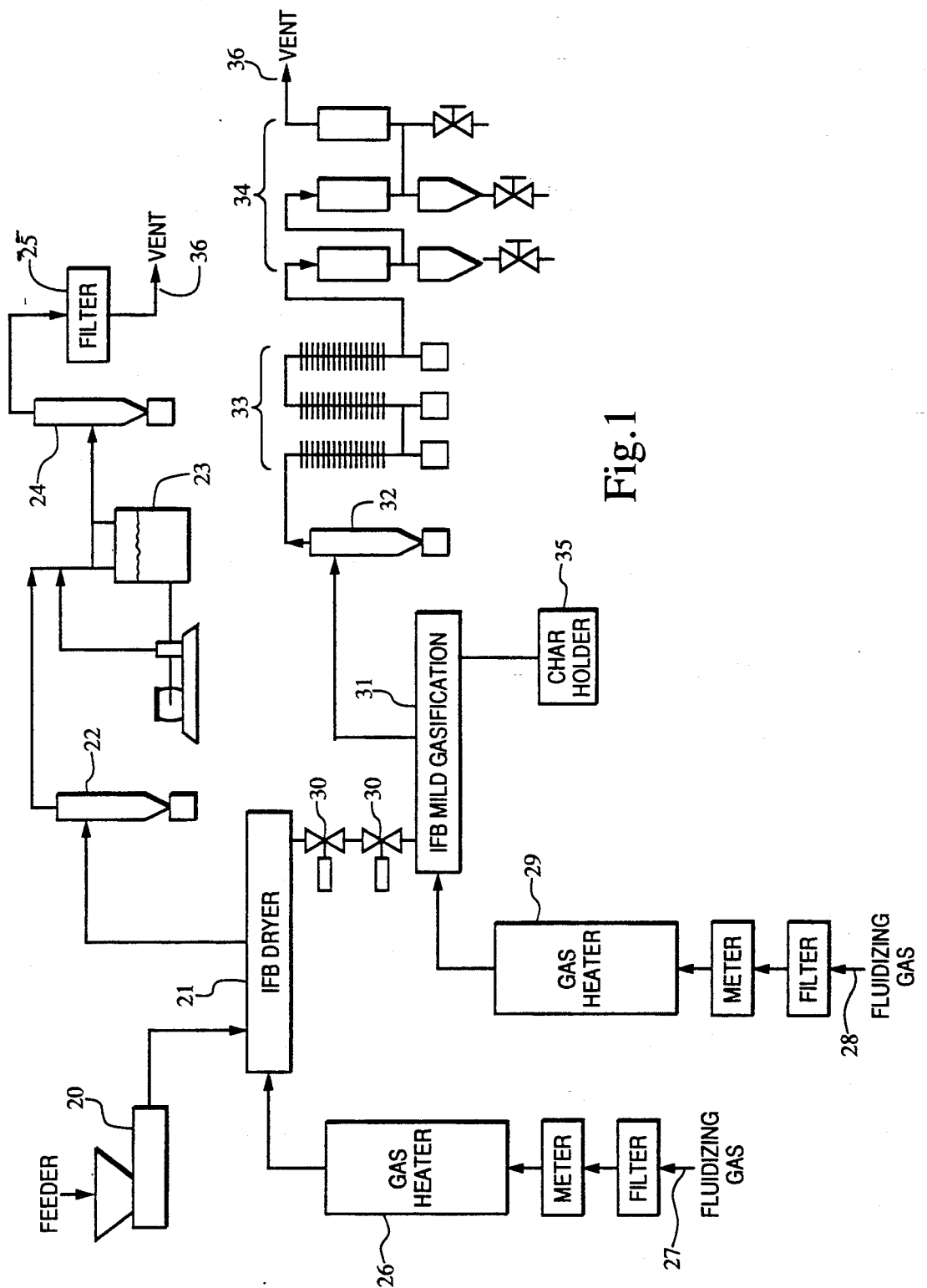
FIG. 1 shows the flow sheet for the bench-scale inclined fluidized beds mild gasification system.

FIG. 1 shows the bench-scale version. The coal feeder 20 starts with finely crushed coal whose exact conditions are a function of the coal type and origin and its moisture content. In general the coal ranged from 0.004 to 0.020 inch in average particle diameter. Coal that contains more than 30 percent moisture often was pretreated to minimize caking problems in said feeder assembly.

The feed entered the first zonal inclined fluidized bed 21, commonly referred to as IFB-1, which consisted of two zones which for many coals and operating conditions are usually of approximately equal size. Zone one served as a dryer for the coal, and zone two produced carbon dioxide by partial coal pyrolysis which was subsequently used as recycle fluidizing gas. In this bench-scale version the fluidizing carbon dioxide 27 was supplied externally and heated external to the IFB-1 sufficiently to produce up to about 350° C. of final zone bed temperature. It is noted that generally inclined fluidized beds can be designed with internal bed heaters if desired. The IFB-1 operated at an inclination angle of from about 0 to 15, preferably 5, degrees depending upon the residence time desired for the coal and the capacity to heat the bed and the fluidizing gas.

In operating as a coal dryer the first zone of IFB-1 heats the coal to about 200° C. which lowers the moisture content to below about one percent, and generally occurs in approximately the first half of IFB-1. The second zone heats the coal to about 350° C., preferably from 300° to 350° C. depending upon the coal type and characteristics; the exact temperature utilized must selectively pyrolyze the coal and release substantially carbon dioxide into the gaseous stream. The temperature cannot be too high or other pyrolyzing products will be also produced, and this unwanted, at this time, condition is postponed until the mild gasification reactor. The two zones of IFB-1 can be operated in isolated condition since an inclined fluidized bed is designed to use solids plug-flow with even gas pressure drop so that a minimum of backmixing occurs. Alternatively, these two zones of IFB-1 could be two separate inclined fluidized beds.

The IFB-1 carbon dioxide fluidizing gas was employed up to about 1.5, preferably 1.0 to 1.5, times minimum fluidizing velocity. For coal drying other inert gases could be employed, such as combustion gas substantially void of oxygen, but for this first selective pyrolysis carbon dioxide is preferred since it simplifies subsequent overhead gas treatment. In all current tests only carbon dioxide was employed for basic IFB-1 fluidization; however, in some runs moisture was prepresent in the carbon dioxide.

Another aspect of this coal drying step was to produce as clean a condensed water as possible with particular emphasis upon not obtaining any tars. Although coal fines are present, they represent a removable component. Tars, if present, would make the water generally unusable and also not environmentally disposable. Thus, the maximum temperature of about 350° C., as noted above, is selected for a particular type of coal to assure that only a minuscule, or preferably less, of tars are obtained, but that a significant amount of oxygen has been driven from the coal in the form of carbon dioxide.

The overhead gas stream from IFB-1 21 is treated by conventional means to first remove as much coal fines as possible with a cyclone 22. Then a condenser is employed for water collection; however, because of additional fines present causing plugging and fouling of the condenser, a water spray scrubber 23 was employed. A final dust collector cyclone 24 and filter 25 left essentially carbon dioxide, which for this bench-scale version was vented 36. In larger systems, this carbon dioxide was recycled.

The solids stream leaving IFB-1 21 passed through two valves 30 acting as a lock hopper for the second zonal inclined fluidized bed, IFB-2, 31 which was employed as a mild gasification reactor and nominally contained several zones, preferably four or more. Again in this bench-scale version as shown in FIG. 1, the fluidizing gas was not recycled gas but externally supplied and heated. The operating parameters of inclination angle, fluidization velocity, and residence time were similar to that of IFB-1 21. However, the fluidizing gas 28 can be a wider source of materials, such as nitrogen, steam, carbon dioxide, or preferably the residual overhead, or product, mild gas, since it is potentially available in recycled amounts. Of course, the product mix will be different depending upon what gas is employed. For instance, using steam will produce a high amount of hydrogen in the gaseous product and reduce the amount of char formed. The plug-flow nature of the inclined fluidized bed is important as it nearly excludes backmixing, so that undesirable secondary reactions between the pyrolysis products are minimized.

The critical element of IFB-2 control is two fold: the maximum bed temperature and the rate of bed heating. Controlling these will effect the mild gasification product distribution; thus, depending upon market conditions, it is possible to maximize the amount of the most economically valuable product, be it char, liquids, or low-Btu gas.

The IFB-2 is operated with multiple zones: the first controls the maximum heating rate of the bed and is usually considered to be within about the first one-half, preferably one-fourth, of the reactor length. This heating rate is predicted from difference in the end point temperature measurements of this first zone divided by the residence time for said zone. The other zones are the remainder of the reactor, and the critical one is the final one which controls the maximum bed temperature obtained at the discharge end. Over the range of tests performed, including the pilot plant series, a maximum heating rate of up to about 180° C. per minute was obtained while the maximum bed temperature was 610° C.; however, the preferable design maximum temperature is 650° C. In particular it was found that the higher the heating rate obtained in the beginning zone of IFB-2, the more liquid product yield was obtained and the better became the quality of the char 35.

The char 35 produced has properties that depend upon these control parameters for the IFB-2. Depending upon market conditions the char could be feed into a further reactor to produce refined products, such as carbon black, activated carbon, high purity carbon, coke, as further indicated in FIG. 3. Alternately, the char could provide recycle reheating as it is burned as a combustion fuel. In this bench-scale version, it was stored.

The overhead gas stream from IFB-2 was treated conventionally. First dust was removed with a cyclone 32 and then a series of air and water condensers was employed to selectively obtain liquid factions. In most instances at least three air condensers 33 and three water condensers 34 were employed; however, any convenient number and distribution could be used depending upon the products wanted. After this separation of the liquids, the remaining gas was vented 36 in this bench-scale version rather than utilized as a low-Btu gas source for combustion or recycled.

Figure 2:
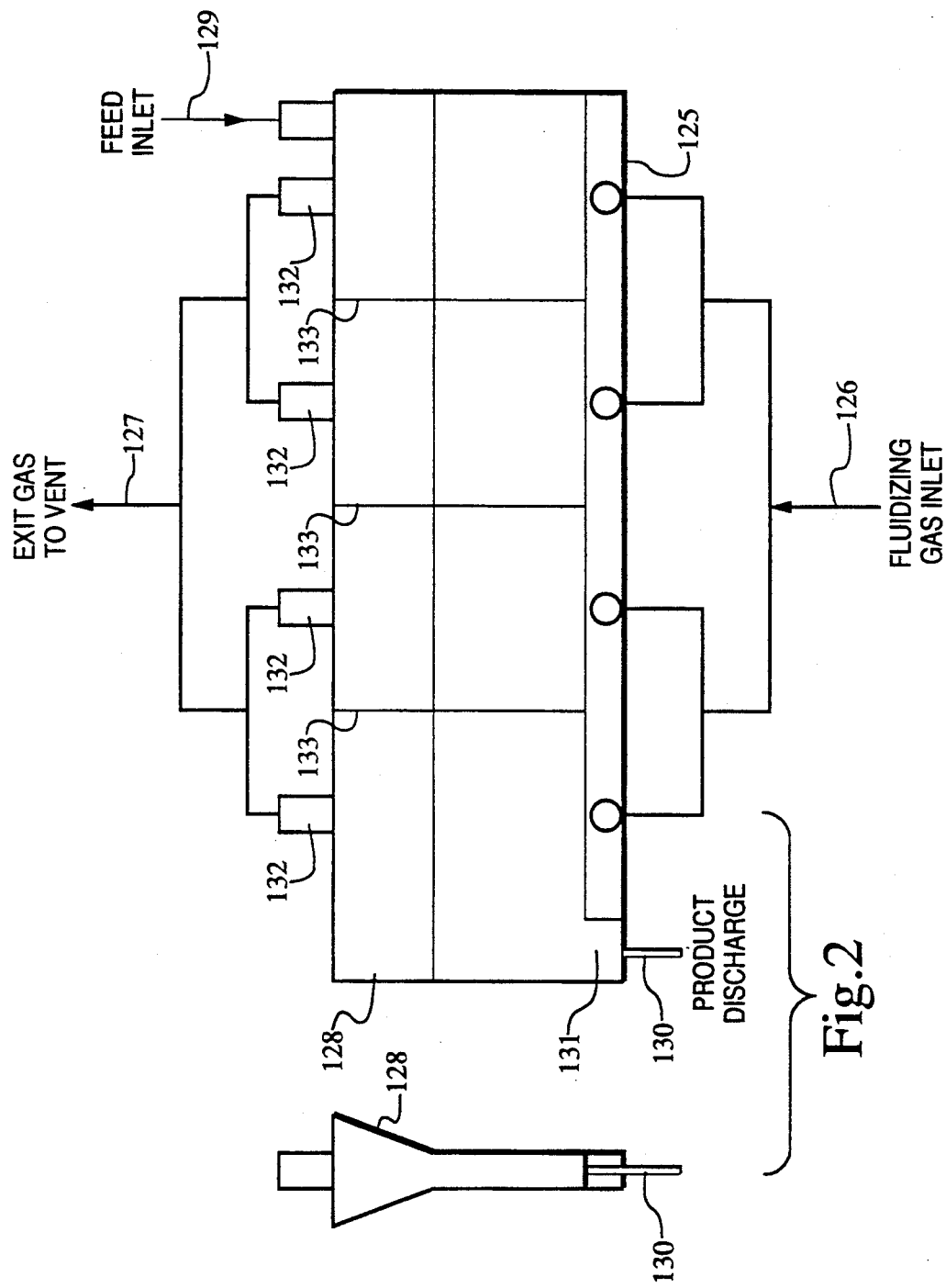
FIG. 2 shows a typical zonal inclined fluidized bed bench-scale model.

FIG. 2 shows a typical drawing of a zonal inclined fluidized bed scaled to bench operation; for convenience four zones are shown but any reasonable number is possible. Main characteristics are the lower gas plenum 125, although shown using the same inlet gas 126 can use different gas streams along the bed length. A further optional feature could be independently controlled heaters in each inlet gas zone for necessary temperature control. Similarly, the exit gas stream 127 is collected into one stream, but can be kept separate if desired, particularly if vapor barriers 133 are installed. The design of the exist gas plenum chamber 128 is purposely to keep the pressure drop constant so that horizonal mixing of the gas fluidizing stream is minimized; thus, separate exit gas streams of different compositions are possible to collect. Further this upper plenum area 128 is by design widened with multiple exit apertures 132 to reduce the gas velocity and allow a disengaging space for larger entrained particles to remain in the bed region. The inlet coal 129 enters the bed and moves approximately horizonal in plug flow as a shallow bed to the discharge position 130 efficiently contacting the gas fluidizing stream. The inclination angle of the bed is measured from the horizontal inlet toward the outlet and is normally expressed as a positive angle in degrees. FIG. 2 shows the zonal inclined fluidized bed positioned horizontally however, lifting of the feed inlet end 129 would produce the usual positive angle. The shallow bed height can be generally controlled by the discharge baffle height 131. This shallow bed keeps the concentration of the contacting gas essentially constant and maximizes the temperature and humidity gradients for efficient dryer operation. The plug flow prevents undesirable back-mixing. In order to reduce solids entrainment, the velocity of the fluidizing gas should be kept at the lowest practical value; however, depending upon other operating parameters, the needed plug flow operation can be obtained over a wide range of velocity conditions, from slightly below to more than twice minimum fluidization. The residence time of the material depends upon the slope of the installed inclined fluidized bed, the feed rate, and the velocity of the fluidizing gas. In any given application, these appropriate parameters can be experimentally determined such that the product produced has the desired characteristics. Scaling the size of inclined fluidized beds is straight-forward because of their simple design.

Current design for the subject inclined fluidized beds represents operation at nominal atmospheric pressure. It would be very feasible to build such inclined fluidize beds that could operate at moderately elevated pressures, such as 50 psi gage. Since reaction rates and equilibriums can dependent not only on operating temperature but also on operating pressures, enhanced recovery of desirable products from mild coal gasification with the current design of equipment could be obtained at modest elevated pressures, such as up to 50 psi gage. Conversely, high pressure operation, such as often is employed in hydrogen reactions, would likely require a complete redesign of the system.

Figure 3:
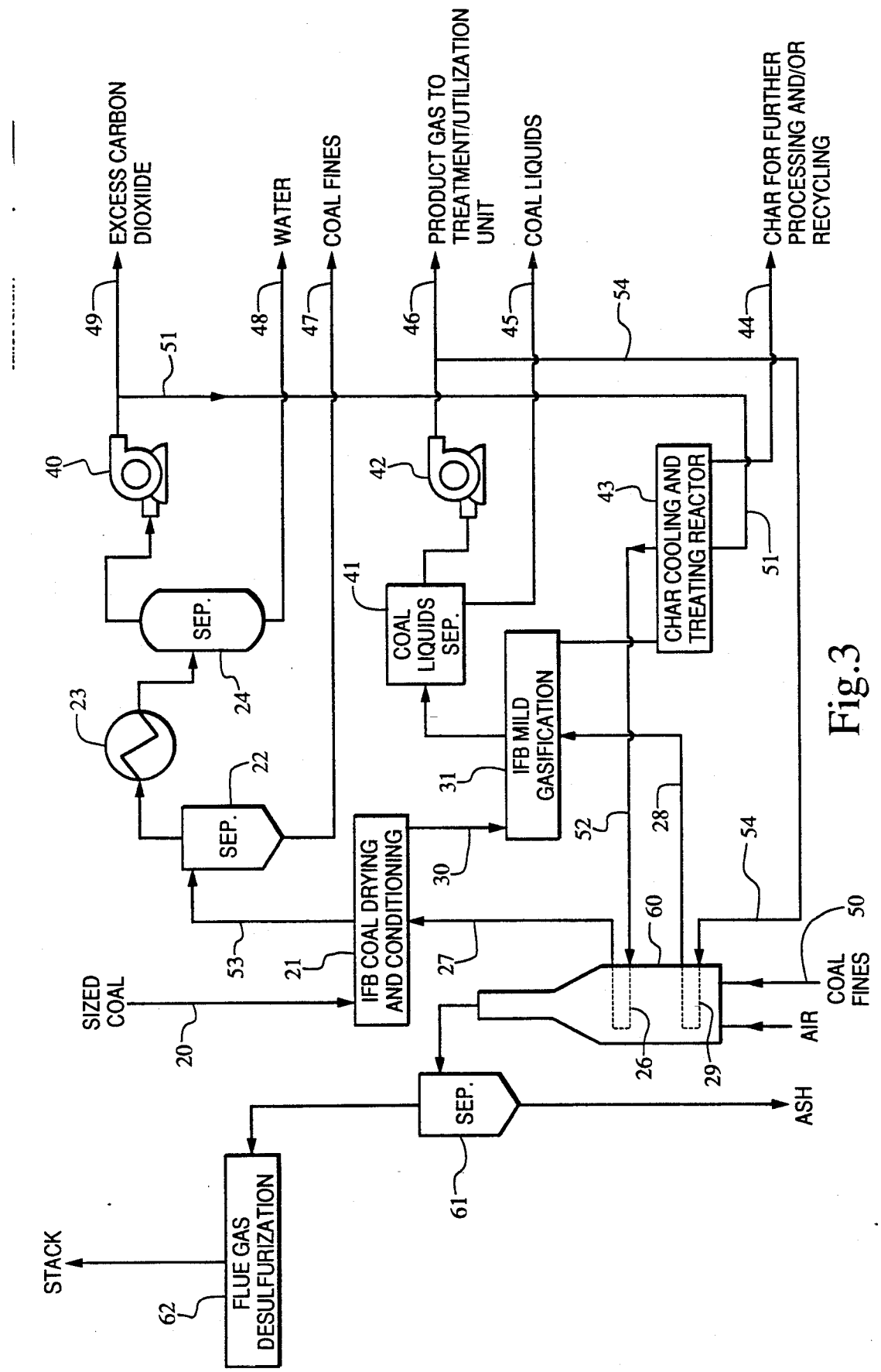
FIG. 3 shows the pilot plant mild gasification system using inclined fluidized beds and recycled gas streams.

FIG. 3 shows a recycled version of the system that is based upon the pilot plant model and presents many of the necessary characteristics needed for a commercial unit. The recycle carbon dioxide 51 is the previous vent gas 36 from the overhead of IFB-1 21 which has been compressed by blower 40. Under some operating conditions an excess of carbon dioxide 49 is present. The other materials from this dryer overhead are water 48 and coal fines 47. Both can be potentially employed are not considered waste products. The recycle stream 51 first is used as a coolant for the product char 44, which can be handled as previously noted, in a reactor 43, which could very well be another inclined fluidized bed. Here the carbon dioxide stream 51 is regeneratively heated 52 before entering the combustion heater 60 for final heating 26 and entering the dryer, IFB-1 21.

The second gas recycle stream 54 comes from the mild gasification IFB-2 31 overhead after the petroleum liquid products 45 have been condensed leaving the product gas 46. This is reheated 29 by the combustor 60, with or without regenerative heating, giving the fluidization stream 28 for IFB-2 31.

The combustor is fed coal fines 50 either from an external sources or at least partially from those collected from the drying operation 47. The combustor gases before being released are passed through a separator 61 for ash removal and a desulfurization step 62 if high sulfur content coal was originally employed as feed 20.

Other recycle variations for this mild gasification system are possible depending upon the overall purpose of the plant. For instance, the combustor could be fed char and its combustion to carbon dioxide would provide the recycle gas for the dryer. In this instance a closed-cycle steam generator could be employed to make steam for the IFB-2 mild gasification. Using this steam the product overhead of petroleum liquids and low-Btu gas would be different than that produced with carbon dioxide. Again the economics of the marketplace at the plant location will govern detailed plant configurations.

EXAMPLE 1

Figure 4:
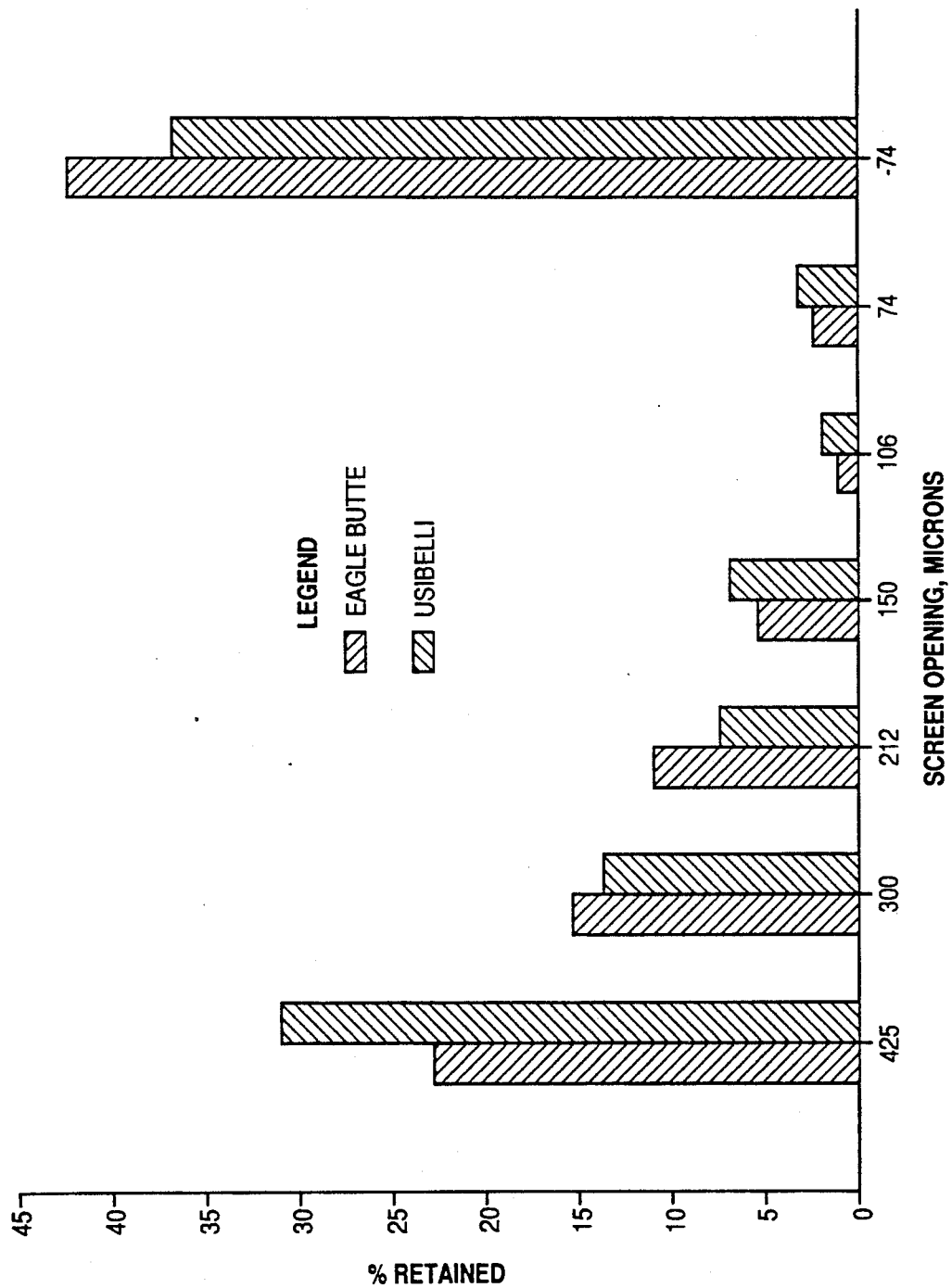
FIG. 4 shows the particle size distribution of crushed feed coals.

In order to dry coal properly without producing unwanted products, it is necessary first to investigate its characteristics in order to determine the desirable temperature settings for the inclined fluidized bed operations. In this bench test of the process two crushed coals were employed: Eagle Butte from Campbell County, Wyo., and Usibelli from near Healey, Ak. The feed coals were crushed to minus 590 microns (minus 28 mesh) to produce an average particle diameter of 70 microns for the Eagle Butte coal and 80 microns for the Usibelli coal by wet screen analysis. Since wet coal fines tend to aggregate during dry screening, wet screen analysis was employed to better characterize the fines distribution. FIG. 4 shows the particle size distributions obtained for these coals. Both coals are high-moisture subbituminous coals with "as received" moisture contents of 29% and 22% for the Eagle Butte and Usibelli coals, respectively. Coincidentally, both coals have a heating value of 8470 Btu/lb. Table 1 gives proximate, ultimate, and heating value analyses of the two coals.

Figure 5:
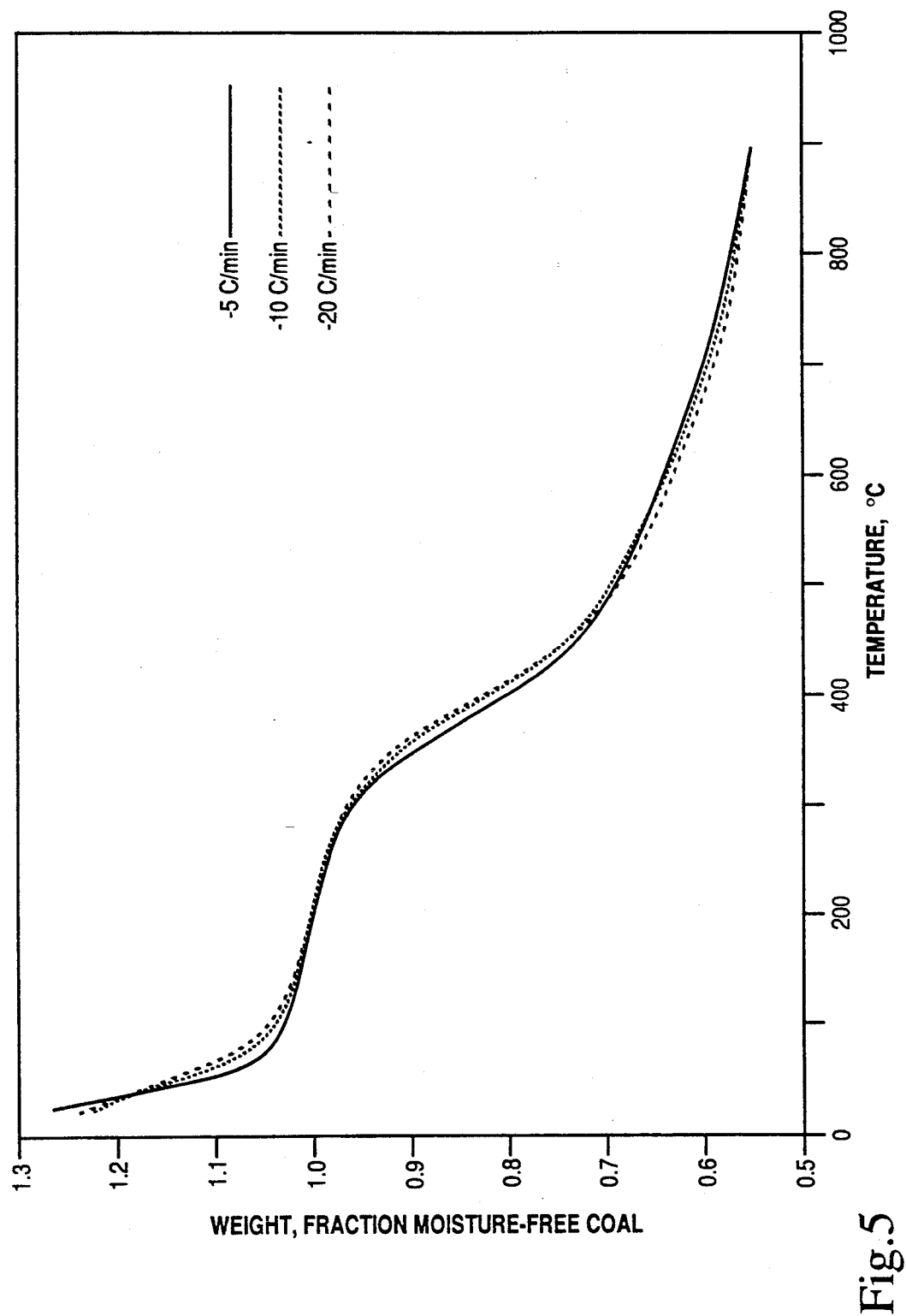
FIG. 5 shows the normalized weight loss profile for Usibelli coal from total gas analysis tests.
Figure 6:
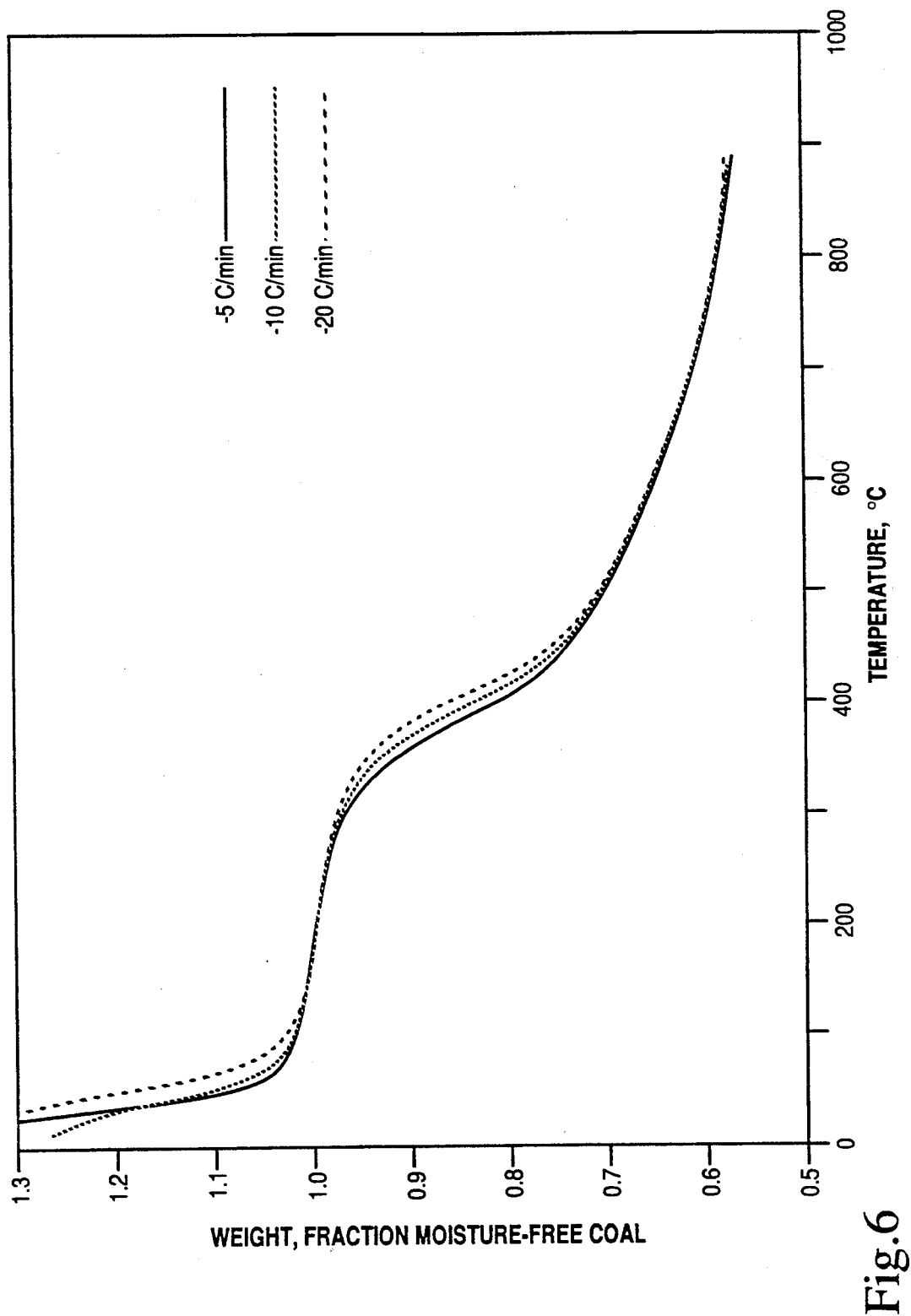
FIG. 6 shows the normalized weight loss profile for Eagle Butte (Wyodak) coal from total gas analysis tests.

Controlled tests of the rate of volatile loss from the coals as they were heated at different heating rates are summarized in FIGS. 5 and 6. The heating rate parameters on these graphs do not significantly affect the results. In all cases the moisture is effectively removed by 200° C. At higher temperatures gases other than water are emitted as pyrolysis becomes important.

Further gas analysis by component indicated that hydrogen gas has maximum rates of evolution near 500° C. Methane has a broad evolution peak with a maximum near 500° C. Ethene has a maximum rate of evolution near 400° C. but also evolves at a lower rate to 800° C. Carbon dioxide has a broad evolution profile starting near 100° C. and extending to 1000° C. with a maximum near 400° C. Hydrogen is not formed in significant amounts below 500° C. These results are essentially valid for both coals. These conversion studies indicate that for both coals significant pyrolysis conversion starts at near 250° C. with predominately carbon dioxide formed as the gaseous product below 400° C.; however, as the carbon dioxide forms, these pyrolysis reactions will also produce considerable liquid tar.

From the above information the preferred embodiment optimum operating conditions for the dryer section, IFB-1, are to keep the bed temperature below 200° C. for only drying. This will evolve moisture without allowing any significant pyrolysis to occur. Then rapid heating to about above 290° C. but less than approximately 325° C. will evolve carbon dioxide with little tar produced so that the overhead stream is essentially free from vaporized petroleum-type products.

TABLE 1

| Results of Chemical Analyses of Feed Coals | | |
|---|---|---|
| Analysis | Eagle Butte | Usibelli |
| Proximate (wt % as received) | | |
| Volatile Matter | 30.9 | 36.4 |
| Fixed Carbon | 35.2 | 33.3 |
| Ash | 4.7 | 8.3 |
| Moisture | 29.2 | 22.0 |
| Ultimate (wt % on dry basis) | | |
| Carbon | 67.4 | 61.5 |
| Hydrogen | 5.1 | 5.2 |
| Nitrogen | 0.9 | 0.9 |
| Sulfur | 0.6 | 0.2 |
| Oxygen | 19.4 | 21.6 |

TABLE 1-continued

| Results of Chemical Analyses of Feed Coals | | |
|---|---|---|
| Analysis | Eagle Butte | Usibelli |
| Ash | 6.6 | 10.6 |
| Heating Value. Btu/lb | 8470 | 8470 |

Figure 7:
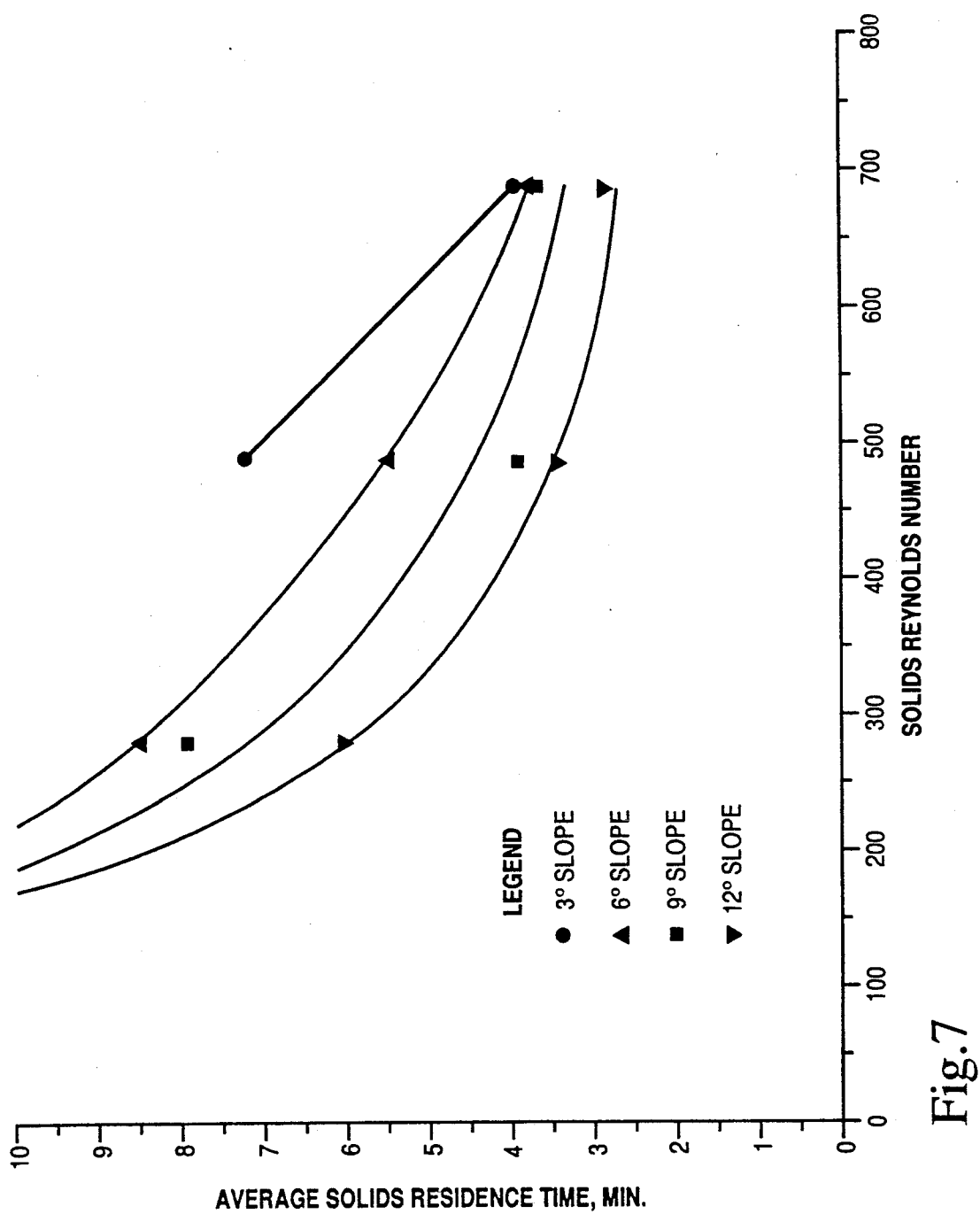
FIG. 7 shows cold flow inclined fluidized bed tests for Eagle Butte (Wyodak) coal.
Figure 8:
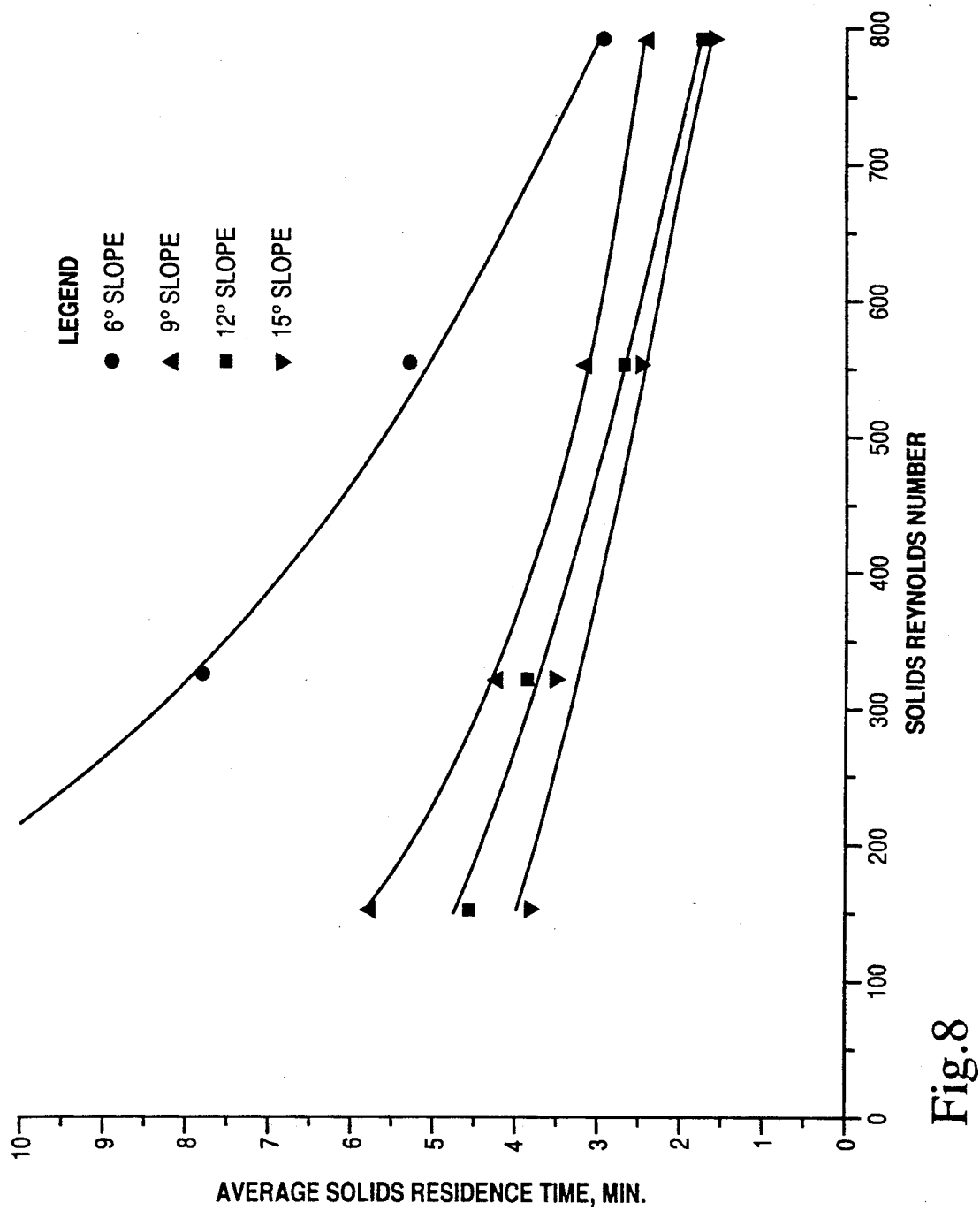
FIG. 8 shows cold flow inclined fluidized bed tests for Usibelli coal.

A series of cold flow experiments were run to determine the solids residence time relationship to the gas-flow conditions with the slope of the inclined fluidized bed as a parameter. If too low a gas velocity is employed, the material will plug the inclined fluidized bed. The correlation was made using a solid Reynolds number thus:

$$N_{RE} = [D_S V_G P_S][u_G]^{-1};$$

where $N_{RE}$ is the solids Reynolds number, $D_S$ is the average diameter of the solid particles, $V_G$ is the fluidizing gas velocity, $P_S$ is the solid particles density, and $u_G$ is the gas viscosity. Units are appropriately picked to make this solids Reynolds number dimensionless. FIGS. 7 and 8 show the results of these cold-flow test correlations. These allow operating conditions to be rapidly obtained for a wide range of process conditions.

EXAMPLE 2

For the mild gasification bench tests three coals were selected: Wyodak or Eagle Butte Coal from Gillette, Wyo.; Illinois No. 6 or Delta Coal from Marion, Ill.; and Indiana No. 3 or Chinook from Brazil, Ind. Table 2 gives typical properties of these coals. Because Wyodak was readily available and had been investigated in dryer studies, most test were performed with it. Further, Wyodak is a noncaking coal which handles well in inclined fluidized beds. Delta and Chinook are caking coals and are similar in other properties; therefore, for testing purposes only Illinois No. 6 was employed.

These mild gasification tests were run in nominal 10 lb/hr capacity inclined fluidized bed reactors; the first as a coal dryer, the second as a gasifier. The general run parameters were picked to maximize the production of clean pitch, the most valuable liquid product, and to obtain highly reactive char with a hydrogen-to-oxygen mass ratio of at least 0.125. Pyrolysis studies indicate that this H/O ratio condition can be generally met if the bed temperatures are kept below 650° C. This would allow char upgrading without employing any external hydrogen.

TABLE 2

| Typical Composition/Characteristics of Feed Coals for Mild-Gasification Project | | | |
|---|---|---|---|
| Coal Seam | Wyodak | Illinois No. 6 | Indiana No. 3 |
| Coal Rank | Subbituminous | Bituminous | Bituminous |
| Mine Name | Belle Ayr/ Eagle Butte | Delta | Chinook |
| Nearest City, State | Gillette, WY | Marion, IL | Brazil, IN |
| Proximate Analysis, % (as received) | | | |
| Moisture | 30.68 | 9.00 | 13.50 |
| Ash | 4.93 | 10.84 | 10.46 |
| Volatile Matter | 33.66 | 32.58 | 35.98 |
| Fixed Carbon | 30.73 | 47.58 | 40.06 |
| Sulfur | 0.35 | 2.85 | 4.20 |
| Forms of Sulfur | | | |
| Pyritic | 0.05 | 1.31 | 2.25 |
| Organic | 0.28 | 1.51 | .81 |
| Sulfate | 0.02 | 0.03 | 0.14 |
| Ultimate Analysis, | | | |

TABLE 2-continued

| Typical Composition/Characteristics of Feed Coals for Mild-Gasification Project | | | |
|---|---|---|---|
| Coal Seam | Wyodak | Illinois No. 6 | Indiana No. 3 |
| % (Dry Basis) | | | |
| Carbon | 68.96 | 70.84 | 67.99 |
| Hydrogen | 5.29 | 4.84 | 5.16 |
| Ash | 7.11 | 11.91 | 12.09 |
| Sulfur | 0.50 | 3.13 | 4.86 |
| Nitrogen | 0.94 | 1.38 | 1.32 |
| Chlorine | 0.01 | 0.13 | 0.05 |
| Oxygen | 11.91 | 7.07 | 7.39 |
| Btu/lb, as received | 8,300 | 11,600 | 10,982 |
| Btu/lb. Dry | 11,975 | 12,747 | 12,696 |

The conditions for clean pitch production requires high heating rates, high sweep-gas flow rates and the use of small average particle sizes of coal.

The dryer IFB-1 operated generally with a bed of average particle diameters of about 0.003–0.020 inches and temperatures near 300° C. using approximately up to about three degrees inclination, which was adequate to produce a residence time of about two minutes, and inlet gas fluidizing temperatures in the approximate range of 450°–575° C. The expected results were obtained of essentially zero moisture content of the coal and a condensed overhead water containing approximately one percent fines.

For the mild gasification reactor, IFB-2, typical test conditions are summarized in Table 3. The fluidization velocity and inclination slope of this IFB were adjusted to keep the residence time for the input dried coal to about 5 minutes. For best mode conditions, a slope near three degrees was preferred. Generally carbon dioxide was employed as the fluidization gas, but an occasional test employing nitrogen or stream with carbon dioxide was used, and the product streams varied as shown in Table 5, where the values are reported on a moisture, ash free (MAF) basis.

The product char produced generally was within desirable quality with a heating value of approximately 12,500 Btu/lb with a H/O mass ration above the desired 0.125, and usually in the 0.2–0.3 range. The ash ran consistently about 9–10 wt %, the fixed carbon about 72–79 wt % and the volatiles about 12–20 wt %, all well in acceptable ranges. With the particles sizes employed, higher final bed temperatures lead consistently to decreased amounts of volatiles in the char. As shown in Table 3, this final bed temperature was usually about 650° C.; this temperature was indicated previously as a reasonable design value.

TABLE 3

| Conditions for Mild Gasification Tests | | | | | | |
|---|---|---|---|---|---|---|
| Test | Coal Particle Size, inches | Bed Temperature, °C. | | | | Fluidizing Gas | Solid Residence Time, min |
| | | Zone 1 | Zone 2 | Zone 3 | Zone 4 | | |
| MGT-06 | 0.012 | 449 | 532 | 585 | 621 | $CO_2$ | 5 |
| MGT-07 | 0.003 | 426 | 518 | 593 | 624 | $CO_2$ | 5 |
| MGT-08 | 0.012 | 425 | 534 | 610 | 657 | $CO_2$ | 5 |
| MGT-09 | 0.012 | 424 | 516 | 577 | 596 | $CO_2$ | 5 |
| MGT-10 | 0.020 | 423 | 513 | 588 | 616 | $CO_2$ | 5 |
| MGT-11 | 0.020 | 432 | 510 | 541 | 549 | $CO_2$ | 5 |
| MGT-12 | 0.020 | 474 | 541 | 592 | 629 | $CO_2$ | 5 |
| MGT-14 | 0.003 | 413 | 559 | 610 | 649 | $CO_2$ | 5 |
| MGT-15 | 0.020 | 387 | 516 | 587 | 616 | $N_2$ | 5 |
| MGT-16$^a$ | 0.003 | 394 | 564 | 631 | 666 | $CO_2$ | 5 |
| MGT-18 | 0.003 | 373 | 554 | 616 | 636 | 38% | 5 |

TABLE 3-continued

Conditions for Mild Gasification Tests

| Test | Coal Particle Size, inches | Bed Temperature, °C. | | | | Fluid-izing Gas | Solid Residence Time, min |
|---|---|---|---|---|---|---|---|
| | | Zone 1 | Zone 2 | Zone 3 | Zone 4 | | |
| MGT-19 | 0.020 | 415 | 513 | 553 | 599 | H₂O 62% CO₂ CO₂ | 5 |
| MGT-20 | 0.003 | 401 | 527 | 570 | 632 | CO₂ | 10 |
| MGT-21 | 0.020 | 390 | 507 | 571 | 613 | CO₂ | 10 |

All tests were run using Wyodak coal from the Eagle Butte Mine.
*a*2 wt % trona mixed with coal feed.

TABLE 4

Heating Rate Conditions Used for Mild Gasification Tests

| Test | | Bed Temperature, °C. | | | | Heating Rate, °C./min | |
|---|---|---|---|---|---|---|---|
| Plan | Actual | Zone 1 | Zone 2 | Zone 3 | Zone 4 | Zone 1 | Zone 2 |
| 106 | 115 | 348 | 465 | 490 | 510 | 167 | 52 |
| 105 | 117 | 354 | 491 | 530 | 562 | 177 | 61 |
| 104 | 118 | 414 | 543 | 576 | 609 | 186 | 57 |
| 108 | 119 | 383 | 511 | 535 | 566 | 182 | 57 |
| 108 | 120 | 423 | 551 | 577 | 611 | 154 | 57 |

TABLE 5

Distribution of Coal Products from Mild Gasification Tests (MAF Basis)

| Test | 6 | 7 | 8 | 9 | 10 | 11 | 12 |
|---|---|---|---|---|---|---|---|
| Gas from Dryer | 0.018 | 0.018 | 0.017 | 0.018 | 0.018 | 0.018 | 0.018 |
| Gas from Fixed Carbon | 0.024 | 0.013 | 0.054 | 0.010 | 0.002 | 0.021 | 0.007 |
| Gas plus oil loss | 0.180 | 0.215 | 0.290 | 0.226 | 0.242 | 0.199 | 0.177 |
| Liquids Collected | 0.167 | 0.144 | 0.084 | 0.121 | 0.083 | 0.141 | 0.181 |
| Char | 0.611 | 0.609 | 0.554 | 0.626 | 0.655 | 0.621 | 0.617 |
| Total | 1.000 | 0.999 | 0.999 | 1.001 | 1.000 | 1.000 | 1.000 |

| Test | 14 | 15 | 16 | 18 | 19 | 20 | 21 |
|---|---|---|---|---|---|---|---|
| Gas from Dryer | 0.017 | 0.017 | 0.017 | 0.018 | 0.018 | 0.019 | 0.018 |
| Gas from Fixed Carbon | 0.016 | 0.019 | 0.066 | 0.099 | 0.011 | 0.041 | 0.065 |
| Gas plus Oil Loss | 0.228 | 0.266 | 0.253 | 0.265 | 0.247 | 0.222 | 0.278 |
| Liquids Collected | 0.127 | 0.083 | 0.096 | 0.123 | 0.118 | 0.174 | 0.120 |
| Char | 0.612 | 0.615 | 0.568 | 0.494 | 0.605 | 0.544 | 0.520 |
| Total | 1.000 | 1.000 | 1.000 | 0.999 | 0.999 | 1.000 | 1.001 |

The another important product was the liquid condensed from the overhead stream of the mild gasification reactor, and in particular the clean pitch. These liquids can be collected in a variety of ways producing different fractions; in most operations the economic value of a given fraction would determine whether it was separately removed by selective condensation. For most tests performed, the production of clean pitch was the most desirable liquid. FIG. 1 shows various arrangements of air and water condensers can be employed to produce these desirable fractions. FIG. 1 also shows fines removal for this stream which under most test conditions amounted to about five weight percent of the feed dry coal to the mild gasification reactor. In most applications, this fines removal must be accomplished at temperatures high enough to not also allow condensation of liquids.

Typical results of analysis of the raw coal and the collected liquids showed that on the average about the following percentages of the elements, using an MAF basis, occurred in this liquid product: carbon, 13%; hydrogen, 27%; nitrogen, 17%; sulfur, 12%; and oxygen, 9%.

Three condensate streams were analyzed. As shown in FIG. 1, the first two air condensers were classified as the first stage, the third air condenser and the first water condenser as the second stage, and the last two water condensers as the third stage. Using carbon dioxide, on the average about the following percentages were obtained for the amount of liquid in each stage: 1st, 13%; 2nd, 23%; 3rd, 64%. When steam and carbon dioxide, test MGT-18, were employed about these same results were obtained; however, when nitrogen was employed, test MGT-15, the results were: 1st, 40%; 2nd, 38%, 3rd, 22%. This is a direct result of the lower heat capacity of the nitrogen allowing the fixed cooling capacity of the air cooled condensers to produce a lower temperature and thus condense a larger fraction of the liquid in the early stages.

The carbon dioxide results for the three stages of liquid collection were further tested for physical properties, and the results varied widely, especially for a property like viscosity; however, a few generalities can be made. The pour point decreased from 1st to 3rd stage as would be expected. The specific gravity was slightly higher in the 1st stage, about 1.2, over the later two stages, about 1.09. The heating value was nearly the same over the stages and averaged about 15,500 Btu/lb.

One significant result was that the ash content was consistently higher in the 1st stage implying that fines were being collected. Thus, under some operating conditions where fines are not a detriment, such as when this stage would be used to treat dried coal, this first stage could be also employed as a fines collector, if condenser plugging was avoided.

A boiling point range analysis was performed on these liquids. As expected, much scatter in the data occurred. A few generalization, however, are possible. Approximately one-half or more of all liquids boiled over 538° C., especially for 1st stage results. Below 204° C. little boiling analysis results were detected. In the range 204°-427° C. the delta 38° C. test increments produced a region of typically about 10–14 wt % amounts for stages 2 and 3. Stage 1 results remained essentially small up to 316° C. From 427°-538° C. the amounts generally were between about 4–8 wt % and typically stage independent.

Various boiling fractions are normally marketable, and some of the above boiling distributions can be blended for usage as diesel, about 200°-371° C. range, and gasoline, about below 204° C. range; both of these could be considered a form of light oil. Others fall in the pitch region, about above 371° C., and can be either clean, if their ash content is below 0.35%, otherwise dirty.

An elemental analysis of the liquids collected in each stage for carbon, hydrogen, nitrogen, sulfur, oxygen, and ash showed little differences between the stages, with the exception of the previously mentioned higher ash content of the 1st stage. The H/C ratio was in the range of about 1.1–1.3 with little apparent stage differentiation.

Nuclear magnetic resonance tests using $^1H$ and $^{13}C$ on the liquids of the 3rd stage produced the conclusions that on an atomic basis the hydrogen was primarily in aliphatic form while the carbon was more equally divided between the aliphatic and aromatic states. Additionally some olefinic hydrogen was detected especially when carbon dioxide was employed as the fluidizing gas. This olefinic form could cause potential polymerization in long term storage and vary the liquid properties.

The gas product from this mild gasification of Wyodak coal was just a few percent by volume of the total overhead stream; thus, variations in analysis results were large. The heating value calculated from gas chromatographic analyses averaged about 650 Btu/scf, and the main components were carbon monoxide and methane with higher hydrocarbons, probably from some light oil, adding a slight amount toward this heating value total. An exception was the test MGT-18 employing a mixture of steam and carbon dioxide as the fluidizing gas; in this instance about half of the gas was hydrogen by volume.

As noted previously, this gas can be burned to provide heat for the fluidization gas streams since the amount of this mild gasification stream is small, or it can be recycled back to the mild gasification reactor. In instances where it is desired to recover this low Btu gas for external use, the operating conditions on the mild gasification reactor, IFB-2, would be changed to operate the system in a more optimum condition for the increased production of this overhead gas.

EXAMPLE 3

A series of larger tests were performed on a pilot plant scale designed for 100 lb/hr coal feed rate. The tests ran either 8 hours or 24 hours depending upon the particular run. Although FIG. 4 shows a typical feed coal analysis, other fractions can be separated out, and for these pilot plant test minus eight mesh coal was the preferred size.

Figure 9:
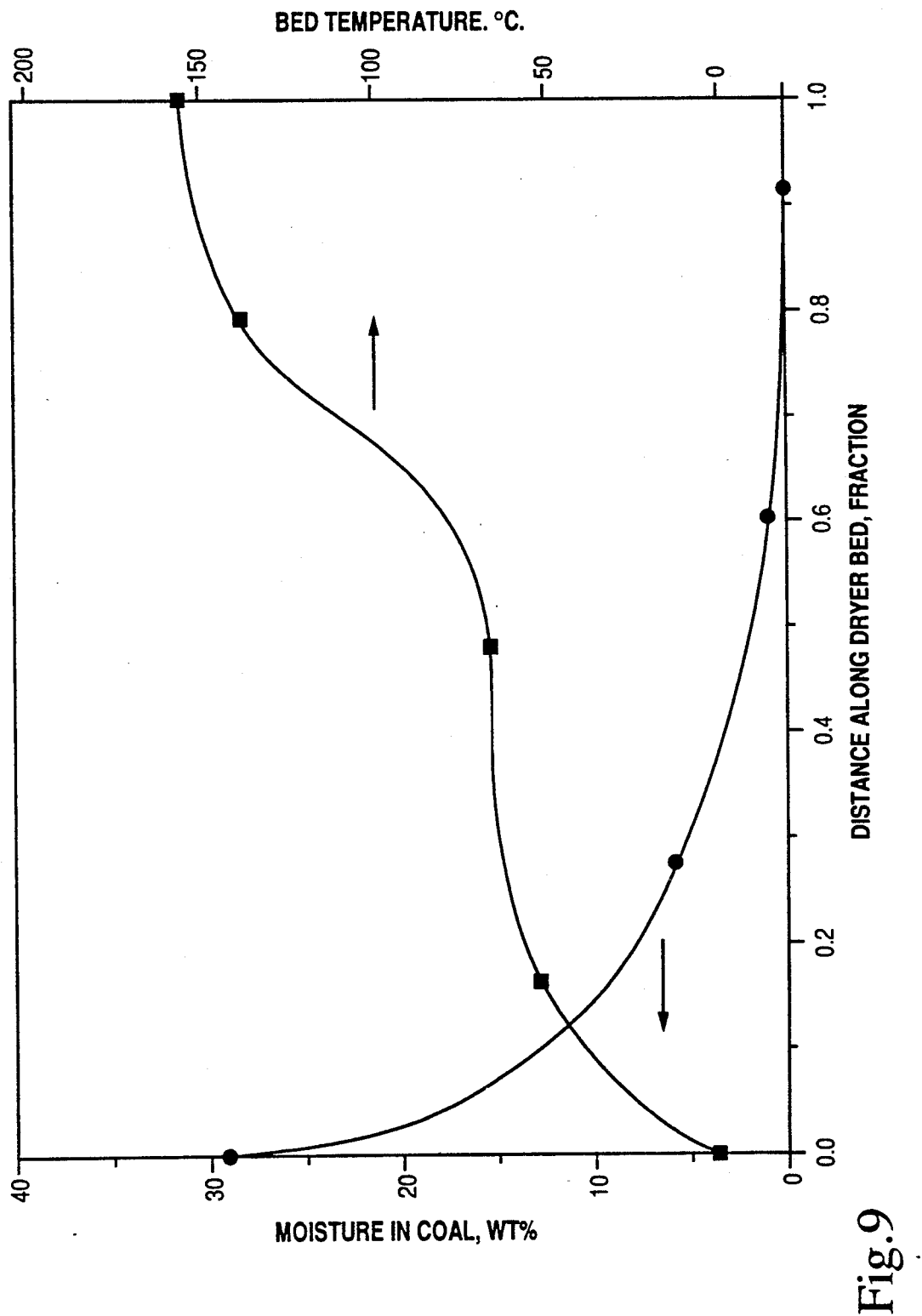
FIG. 9 shows typical moisture and temperature profiles for inclined fluidized bed drying.

The dryer section of the system, IFB-1, produced results of which FIG. 9 is typical for test 117, a 24 hour run. In this instance the bed temperature reached only slightly above about 150° C. as carbon dioxide pyrolysis only was desired and not the production of other tars. As FIG. 3 shows, necessary carbon dioxide was recycled back into the system.

This test 117 produced the following breakdown of products from the dryer, IFB-1, and the mild gasification (MG) reactor, IFB-2, from this 24 hour system performance in wt % of the raw coal feed:

| | |
|---|---|
| Fines from dryer | 5.5 |
| Water from dryer | 29.8 |
| Gas from dryer | 0.9 |
| Fines from MG reactor | 2.5 |
| Char | 40.0 |
| Gas from MG reactor | 8.9 |
| Liquids from MG reactor | 14.6 |

This totals 102.2 indicating about a two percent closure error in the material balance, a generally acceptable amount for this size and length of test. Similar results were obtained for other tests of this series.

The conditions of mild gas reactor operation are shown in Table 4 for the four measured zones. The important values are the maximum bed temperature obtained in zone four, just before discharge, and the heating rate in zone one, shortly after the dried coal enters.

Typical concentrations of the overhead mild gas produced can be represented by the run 117 results which were by vol %: $H_2$, 10.14; CO, 19.16; $CO_2$, 33.99; $CH_4$, 28.24; other hydrocarbons, 8.47. The heating value was calculated as 490 Btu/scf. In addition to the above, this gas contained $H_2S$ in the about 1000-2000 ppm range. The presence of hydrogen in this gas would not be expected based upon bench-scale runs since only carbon dioxide was employed as the fluidization gas. However, with recycle over longer periods some contaminants build-up, including water; thus, this hydrogen could come from water reacting with carbon monoxide, the cracking of coal liquids, or the high temperature pyrolysis of char. Perhaps all three contribute to the hydrogen found.

The char produced was good quality with an average composition in wt % of about: fixed carbon, 73.9; volatiles 17.5; ash 8.6. This is similar to the results obtained in the bench-scale runs above. The C/H atomic comparison was good; for instance, test 117 had about a 2.5 ratio.

The liquids generally met the requirement of less than 0.35% ash needed for clean pitch with the exception of the first air condenser product. For instance, this produced for test 117, a typical run, an ash level of 1.2%, or in the dirty pitch range, while the remainder of the condensed pitch from this run met the clean pitch standard.

The previous conclusion is reinforced: The first few air condensers can be employed as a fines and dust collector if care is taken not to plug any condenser, but the product will at best be dirty pitch.

An alternate fines removal system consists of one or more wet scrubbers employing water. This serves as an efficient removal of the fines and can substitute for a fines hot bagging operation, which often is a difficult process to keep in continual operation. However, water scrubbing leaves the stream now saturated with moisture, which will likely have to be removed down stream. If the fines are to be recovered, a subsequent drying will be desirable.

The amount of liquids produced when calculated on a moisture, ash free (MAF) wt % basis of coal fed to the mild gasification reactor, IFB-2, for the various runs produced were: run 115, 9.8; run 117, 12.3; run 118, 17.0; run 119, 14.9; run 120, 14.3. As shown in Table 4 runs 117 and 119 reached essentially the same maximum bed temperature, 562° C. and 566° C. respectively, but their initial heating rates were different, 159° to 164° C./min respectively, leading to a higher liquid yield for run 119. The same happening occurs between runs 118 and 120.

The general conclusion is that product liquid yields from the mild gasification reactor are larger for higher maximum bed temperatures and initial high heating rates. Both of these conditions require a high temperature for the recycled fluidizing gas, in the 705°-815° C. range for the tests shown here. However, to produce an initial high heating rate requires that the feed dried coal not be over-heated coming from the dryer since this will reduce the temperature difference driving force between said dried coal and the heating stream fluidized gas. Alternatively, internal heating coils could be provided in the initial zone of the inclined fluidized bed, or a longer residence time provided for the coal; however, neither of these options is normally economically justified.

EXAMPLE 4

A series of mild gasification tests were run using Illinois No. 6, a bituminous high sulfur coal showing high caking ability. Therefore, when employing caking coals, the temperature at which sufficient caking occurs to cause clogging of the equipment must be pre-determined before inclined fluidized bed operating temperatures can be established. In the instant case agglomeration tests were preformed in a separate, small packed bed. The results for this Illinois No. 6 coal were that approximately up to about 280° C. agglomeration did not occur; however, at about 330° C. severe agglomeration occurred.

Previous state of the art knowledge about caking coals suggests that using a rapid heating rate of about 15° C./min to above about 400° C. could overcome the caking problems. However, in all mild gasification tests performed with an inclined fluidized bed these conditions produced mixed results for the reactor; said Illinois No. 6 coal formed a cake some where along the bed which destroyed the normal fluidization and essentially limited the pyrolysis reaction.

On the other hand, the dryer inclined fluidized bed operating in a range of temperatures usually below caking potential could be operated successfully without such caking problems. Of course this Illinois No. 6 coal only had a moisture content of about 9 wt %, so drying was not as great a problem. However, for caking coals efficient dryer operation is needed, for the drier the coal becomes, the less potential for caking.

In one mild gasification test with this Illinois No. 6 coal, the cake formed near the midpoint of the reactor, and on an MAF wt % basis only about 18% of the volatiles expected to be removed were removed.

Thus, in production situations significant pre-runs would be involved to find appropriate temperatures and heating rates to consistently overcome caking. With the great flexibility of operation of inclined fluidized beds, including using potential additives, these necessary operating conditions for caking coals, like Illinois No. 6, should be readily discoverable.

From the information of this invention one skilled in the art should be able to design a mild gasification system that could maximize the value of yields from char, liquids, and low Btu gas.

The foregoing description of the specific embodiments will so fully reveal the general nature of the invention that other can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A process for the selective pyrolysis of coal employing an operating four zone inclined fluidized bed apparatus comprising:
   introducing said coal into the inlet of zone one; introducing fluidizing gas into zone one to dry said coal;
   maintaining the drying temperature of said coal that traverses zone one to below about 250° C.; introducing fluidizing gas into zone two to selectively pyrolyze said coal to produce substantially carbon dioxide;
   maintaining the pyrolyzing temperature of said coal that traverses zone two to below about 350° C.;
   introducing fluidizing gas into zone three to selectively pyrolyze said coal to produce liquid and gas products;
   heating said coal that traverses zone three at a rate about 180° C. per minute;
   introducing fluidizing gas into zone four to selectively pyrolyze said coal to produce liquid and gas products;
   maintaining the pyrolyzing temperature of said coal that traverses zone four to below about 650° C.;
   removing residual char leaving zone four.

2. The process according to claim 1 wherein said fluidizing gas introduced into zones three and four comprises recycle gas remaining after removal of said liquid and gas products.

3. The process according to claim 1 wherein said fluidizing gas introduced into zones three and four comprises steam to produce hydrogen in said gas products.

4. The process according to claim 1 wherein said fluidizing gas introduced into zones one and two comprises said carbon dioxide treated for fines and liquid removal and recycled.

5. The process according to claim 1 further comprising burning said residual char to provide energy for heating the fluidizing gas introduced into said zones.

6. The process according to claim 1 further comprising burning said liquid and gas products to provide energy for heating the fluidizing gas introduced into said zones.

7. The process according to claim 1 further comprising removing fines and moisture from said liquid and gas products, and subsequently condensing pitch and light oil therefrom.

8. The process according to claim 1 wherein said inclined fluidized bed apparatus further comprises an operating pressure of about zero to fifty pounds per square inch gage.

9. The product produced by the process of claim 1.

* * * * *